US009990028B2

(12) United States Patent
Basra (10) Patent No.: US 9,990,028 B2
(45) Date of Patent: Jun. 5, 2018

(54) SYSTEM AND METHOD FOR PROVIDING LIVE AUGMENTED REALITY CONTENT (71) Applicant: Verizon Patent and Licensing Inc., Arlington, VA (US)

(72) Inventor: Arvind K Basra, Glen Ridge, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 117 days.

(21) Appl. No.: 14/506,243

(22) Filed: Oct. 3, 2014

(65) Prior Publication Data
US 2016/0098860 A1 Apr. 7, 2016

(51) Int. Cl.
*G06T 19/00* (2011.01)
*G06F 3/00* (2006.01)
*H04L 29/08* (2006.01)
*H04W 4/00* (2018.01)
*H04W 4/06* (2009.01)
*H04L 29/06* (2006.01)
*A63F 13/65* (2014.01)
*A63F 13/332* (2014.01)
*A63F 13/27* (2014.01)
*H04L 12/18* (2006.01)
*H04L 12/58* (2006.01)

(52) U.S. Cl.
CPC ............... *G06F 3/00* (2013.01); *A63F 13/27* (2014.09); *A63F 13/332* (2014.09); *A63F 13/65* (2014.09); *H04L 12/1827* (2013.01); *H04L 51/32* (2013.01); *H04L 67/325* (2013.01); *H04L 67/38* (2013.01); *H04W 4/008* (2013.01); *H04W 4/06* (2013.01); *H04W 4/80* (2018.02); *H04L 51/10* (2013.01)

(58) Field of Classification Search
CPC ..................................................... G06T 19/006
USPC .................................................. 345/629–633
See application file for complete search history.

(56) References Cited

U.S. PATENT DOCUMENTS

| 8,132,220 B2* | 3/2012 | Merlin | H04N 21/4316 345/629 |
| 2007/0010248 A1* | 1/2007 | Dravida | H04W 60/00 455/435.1 |
| 2007/0015586 A1* | 1/2007 | Huston | A63B 24/0021 463/42 |
| 2012/0004956 A1* | 1/2012 | Huston | G06T 19/006 705/14.1 |
| 2014/0285519 A1* | 9/2014 | Uusitalo | G06T 19/006 345/633 |
| 2015/0046295 A1* | 2/2015 | Hart | G06T 19/006 705/27.2 |
| 2015/0379360 A1* | 12/2015 | Rhee | G01C 21/3644 345/633 |
| 2015/0379774 A1* | 12/2015 | Trainor | G06F 17/30047 345/633 |

* cited by examiner

Primary Examiner — Barry Drennan
Assistant Examiner — Phong Nguyen (57) ABSTRACT A rendering platform for providing live augmented reality content to a user device is disclosed. The rendering platform receives augmented reality content associated with an event via a multicast data channel. A coverage area of the multicast data channel covers a portion of a venue associated with the event. The rendering platform receives a request to present an augmented reality display of the event at the user device within the coverage area. Further, the augmented reality content in the augmented reality display is presented based on the request.

20 Claims, 9 Drawing Sheets

SYSTEM AND METHOD FOR PROVIDING LIVE AUGMENTED REALITY CONTENT

BACKGROUND INFORMATION

Augmented reality (AR) provides rich multimedia content (e.g., text, still images, video clips, sounds, 3-dimensional models and animations) of the real world environment around a user. However, the AR application has not been utilized to their full potential to deliver virtual display that is contextually relevant to a user at the time and place of need. The network connectivity and/or the lens capability have affected the potential of AR applications in overlaying rich multimedia content for live events in real-time for viewing via mobile devices. In addition, the constantly changing database of objects coupled with a confusing user experience for live events makes it difficult for the service provider to ascribe contextual and/or temporal attributes to the live aspect of an event.

Based on the foregoing, techniques are desired for providing live augmented reality content to a mobile device based, at least on part, on user request.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method, and system for providing augmented reality content to a user device, is described. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Augmented Reality (AR) has been around for many years as a tool to help digitally enhance the scenery of the physical world. As discussed, AR has never reached its full potential due to a variety of reasons (e.g., network connectivity, lens capability, constantly changing database of objects etc.). Even though mobile devices have become more capable, and the network connectivity has improved, there are still many challenges for AR to reach its full potential. Presently, various mobile devices use AR to paint an experience not only from an engagement perspective but also for creating secondary experiences. For example, a user may point his mobile device at a TV screen, and receive alternative content in his mobile device. However, the AR requires repetitive requests to the constantly changing databases of information to drive the application behavior and user experience. In one example embodiment, multiple users attending a soccer match may stream various data pertaining to the match. If users point their mobile devices on a player running down the field, the user can see the data change. This becomes a problem because multiple users are downloading the same big file constantly whenever a request for AR content is relayed.

In one scenario, a user only cares about his camera angle, and the extra information he/she can plug in from that vantage point. As the data is changing constantly it is difficult for a user to consume live action at the same time as he consumes other data that overlays on top of the live content. As a result, an efficient approach of delivering the live AR content, and potentially change the information based, at least in part, on temporal information (e.g., what is available at the time of the day), and/or location information (e.g., vantage point of a user) is needed.

Figure 1:
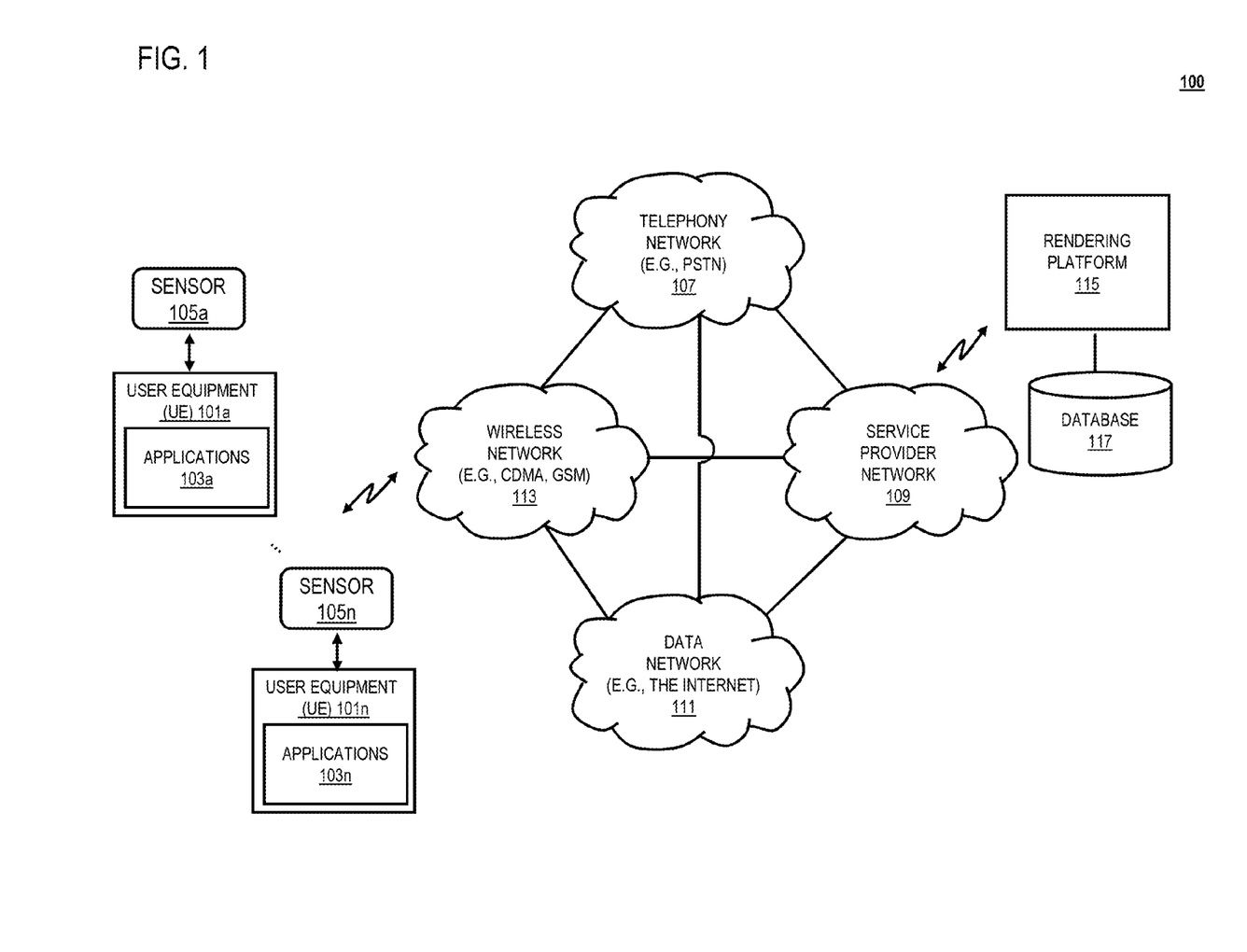
FIG. 1 is a diagram of a system capable of providing augmented reality content to user equipment, according to one embodiment.

FIG. 1 is a diagram of a system 100 capable of providing augmented reality content to user equipment. In one embodiment, the system 100 may provide the augmented reality content associated with an event. In one implementation, the event may be a live event, for example, but is not limited to, a football match, a cricket match, a basketball match, a theatre, a concert, and the like. In one embodiment, the augmented reality content may include, but is not restricted to, live content associated with an event, recorded content associated with an event, a curated content, an advertising content, or a combination thereof. In another embodiment, the augmented reality content may include, but is not restricted to, information related to a service available at an event, a venue of an event, a status of a service, or a combination thereof. The system 100 may also provide the augmented reality content associated with, but is not restricted to, a venue of an event, duration of an event, a location of an event, or a combination thereof, in another implementation.

For the purpose of illustration, the system 100 employs, in certain embodiments, user equipment 101a-101n, hereinafter referred to as user equipment 101. In one embodiment, the user equipment 101 may include, but is not restricted to, a computer, a laptop, a Personal Digital Assistance (PDA), a tablet, a smart phone, a palmtop, a notebook, and the like. It is also contemplated that the user equipment 101 may support any type of interface for supporting the presentment and/or exchanging of data. In addition, user equipment 101 may facilitate various input means for receiving and generating information, including, but is not restricted to, a touch screen capability, a keyboard and keypad data entry, a voice-based input mechanisms, and the like. Any known and future implementations of user equipment 101 may also be applicable.

The user equipment 101 may further include applications 103a-103n, hereinafter referred to as application 103. Further, the application 103 may include various applications associated with, but are not restricted to, productivity, education, entertainment, social networking, web browsing, communications, content sharing, multimedia consumption, map applications, web client, or the like. In one embodiment, the application 103 may be, but is not restricted to, an augmented reality application. In one exemplary scenario, the augmented reality application provides augmented reality content to users on user equipment. In one implementation, the augmented reality application 103 is installed within the user equipment 101. Further, the application 103 is configured to provide the augmented reality content associated with a live event to users, in another embodiment. In yet another embodiment, the application 103 may be considered as a Graphical User Interface (GUI) that provides options to users to request for augmented reality content for a live event. For example, a user is present in a stadium and desires to receive augmented reality content, for example, a match score, a player name, etc., associated with an event such as, a football match, occurring in the stadium then the user initiates the application 103 in the user equipment 101.

Further, the user equipment 101 may use sensors 105a-105n, hereinafter referred to as sensor 105, to determine contextual information. In one embodiment, the contextual information may include, but is not restricted to, location information, location coordinates, time of day, date, and the like. In one implementation, the contextual information may be associated with, but is not restricted to, an event, a venue of an event, user equipment, a user of user equipment, or a combination thereof. Further, the sensor 105 may be used to retrieve augmented reality content of objects (for example, a musician, a player, a football, etc., in one implementation). In an exemplary scenario, the sensor 105 may transmit the augmented reality content via a multicast data channel.

In one exemplary scenario, the sensor 105 may be attached with a player in a football match, which provides augmented reality content, for example, position, speed, and the like, of the player. In another exemplary scenario, the sensor 105 may be attached with a basket ball in a basket ball match, which provides augmented reality content, such as, position of the ball, in a playground. In another embodiment, the sensor 105 may be installed within the user equipment 101 to determine location of the user equipment 101. In one implementation, the sensor 105 may be, but is not restricted to, a Global Positioning System (GPS) sensor. Furthermore, the sensor 105 may be used to detect and capture various signals, information, and contents, for example, an audio, a video, location information, Bluetooth signals, Near Field Communication (NFC) signals, Wireless Local Area Network (WLAN) signals, Radio Frequency Identification (RFID) signals, and the like.

Further, the user equipment 101 may use the sensor 105 to communicate with a rendering platform 115 through various networks including a telephony network 107, a service provider data network 109, a data network 111, a wireless network 113, and the like. For illustrative purposes, the networks 107-113 may be any suitable wireless networks, and are managed by service providers. For example, the telephony network 107 may include, but is not restricted to, a circuit-switched network, such as the Public Switched Telephone Network (PSTN), an Integrated Services Digital Network (ISDN), a Private Branch Exchange (PBX), or other like networks.

Although depicted as separate entities, the networks 107-113 may be completely or partially contained within one another, or may embody of the aforementioned infrastructures. For instance, the service provider network 109 may embody circuit-switched and/or packet-switched networks that may include facilities to provide for transport of circuit-switched and/or packet-based communications. It is further contemplated that the networks 107-113 may include components and facilities to provide signaling and/or bearer communications between the various components or facilities of the system 100. In this manner, the networks 107-113 may embody or include portions of a Signaling System 7 (SS7) network, or other suitable infrastructure to support control and signaling functions. In addition, the system 100 may operate as separate parts that rendezvous and synchronize periodically to form a larger system with similar characteristics.

Further, the data network 111 may be any Local Area Network (LAN), Metropolitan Area Network (MAN), Wide Area Network (WAN), the Internet, or any other suitable packet-switched network, such as a commercially owned, proprietary packet-switched network, such as a proprietary cable or fiber-optic network. Further, the wireless network 113 may employ various technologies including, for example, Code Division Multiple Access (CDMA), Enhanced Data Rates For Global Evolution (EDGE), General Packet Radio Service (GPRS), Mobile Ad Hoc Network (MANET), Global System For Mobile Communications (GSM), 4G Long-Term Evolution (LTE), Internet Protocol Multimedia Subsystem (IMS), Universal Mobile Telecommunications System (UMTS), etc., as well as any other suitable wireless medium, e.g., microwave access (WiMAX), Wireless Fidelity (WiFi), satellites, and the like.

Further, the rendering platform 115 is configured to receive augmented reality content associated with an event, in an embodiment. In one implementation, the augmented reality content may be received through, but is not restricted to, a multicast data channel. The multicast data channel is provisioned based on, but is not restricted to, a venue, a location of an event, duration of an event, or a combination thereof, in an embodiment. In one embodiment, a coverage area of the multicast data channel covers a portion of a venue associated with an event. The rendering platform 115 is further configured to receive a request from a user of user equipment 101 to present an augmented reality display of an event at the user equipment 101, in one embodiment. Further, the rendering platform 115 is configured to receive a scheduling request from a service provider of the augmented reality content, in an embodiment. In one implementation, the rendering platform 115 provides the augmented reality content to user equipment based on a scheduling request received from a service provider of the augmented reality content. In an exemplary scenario, a service provider may request to transmit augmented reality content to user equipment 101 after a predefined time interval, for example, an hour, 15 minutes, etc., after an event starts. The predefined time interval may be considered as a delay time, in one implementation.

The rendering platform 115 may further be configured to present augmented reality content in an augmented reality display at user equipment based on a received request from a user. In an exemplary scenario, a user is at a stadium and missed a part of a game while buying snacks then the user may initiate an augmented reality application in user equipment 101 and the rendering platform 115 presents desired augmented reality content in the user equipment 101. Further, the rendering platform 115 may select the augmented reality content to present to user equipment 101 based on a user request. For example, the rendering platform 115 selects augmented reality content such as a score of a match, to display in the user equipment 101. In one embodiment, the rendering platform 115 may automatically select augmented reality content. In another embodiment, the rendering platform 115 may enable a user to select desired augmented reality content to be displayed in the user equipment 101.

Further, the rendering platform 115 may initiate storage of augmented reality content at user equipment 101 only when the user equipment 101 is located at, but is not restricted to, a venue of an event, during for duration of an event, or a combination thereof. In an exemplary scenario, augmented reality content is stored in user equipment 101 when the user equipment 101 is determined to be present at a venue of the event for which the request is received. The rendering platform 115 may be further configured to update the augmented reality content, in an embodiment. The augmented reality content is updated for delivery to user equipment 101 based on a progression of an event, in one implementation. The updated augmented reality content is then stored in a database 117, in one embodiment. In another embodiment, the augmented reality content may be stored in multiple repositories.

The database 117 further stores profiles of users of the application 103, in one embodiment. The profile of a user may include, but is not restricted to, a name, an address, a phone number, an email, user history, user equipment type and capabilities, user preferences, and the like. The components of the rendering platform 115 are described in conjunction with FIG. 2.

Figure 2:
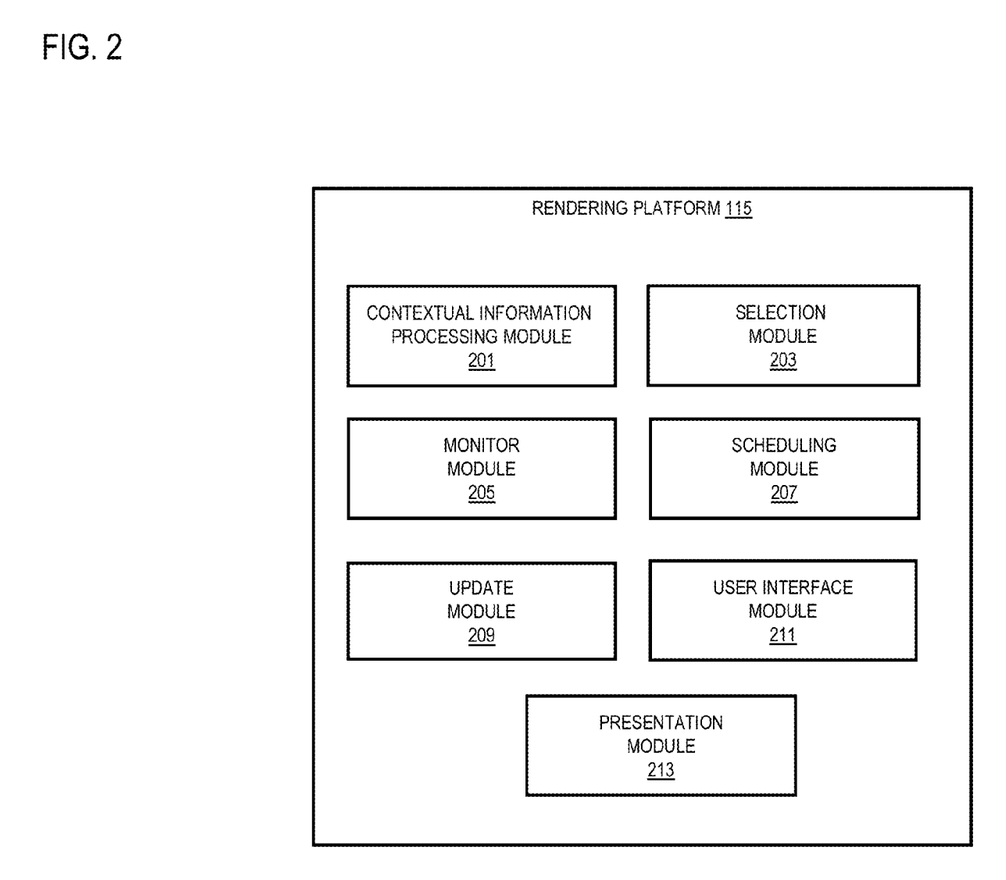
FIG. 2 is a diagram of components of a rendering platform for providing the augmented reality content to the user equipment, according to one embodiment.

FIG. 2 is a diagram of components of the rendering platform 115 for providing augmented reality content to user equipment, according to one embodiment. In one implementation, the rendering platform 115 may be implemented as a part of the service provider network 109, a content provider, and the like. The rendering platform 115 may include various executable modules for performing one or more computing, data processing, or network based instructions that in combination to provide a means for providing augmented reality content via a multicast transmission session to user equipment 101. Such modules may be implemented in hardware, firmware, software, or a combination thereof. The rendering platform 115 may include a contextual information processing module 201, a selection module 203, a monitor module 205, a scheduling module 207, an update module 209, a user interface module 211, and a presentation module 213.

The contextual information processing module 201 may receive augmented reality content associated with an event, in one embodiment. In one implementation, the event may be a live event, for example, but is not limited to, a football match, a cricket match, a basketball match, a theatre, a concert, and the like. In one embodiment, the augmented reality content may include, but is not restricted to, live augmented reality content associated with an event, recorded content associated with an event, a curated content, an advertising content, or a combination thereof. In another embodiment, the augmented reality content may include, but is not restricted to, information related to a service available at an event, a venue of an event, a status of a service, or a combination thereof. In an implementation, the service may include to locate, but is not restricted to, a fully stocked concession, a shortest restroom line, and the like. The contextual information processing module 201 may also receive augmented reality content associated with, but is not restricted to, a venue of an event, duration of an event, a location of an event, or a combination thereof, in another implementation.

Further, the contextual information processing module 201 may receive contextual information, in one embodiment. The contextual information may include, but is not restricted to, geographical location information, location coordinates, time of day, date, user equipment capabilities, and the like. In one implementation, the contextual information may be associated with, but is not restricted to, an event, a venue of an event, user equipment, a user of user equipment, or a combination thereof. The contextual information processing module 201 may further process the contextual information for further use, in one embodiment.

The selection module 203 may select augmented reality content from the received augmented reality content. In one embodiment, the selection module 203 may select augmented reality content from the received augmented reality content based on the contextual information. In one exemplary scenario, the selection module 203 may only select augmented reality content, such as a match score, from the received augmented reality content (for example, a match score, a player name, a position of a player, a position of a ball, etc.). In one implementation, the selection module 203 may select augmented reality content based on the contextual information associated with, but not restricted to, the event, a venue of the event, a user of user equipment, user equipment, or a combination thereof.

In one embodiment, the monitor module 205 may monitor the presentation of virtual content over a predetermined period. The virtual content may be presented based, at least in part, on a live event that occurred up to a point in time on a continuous basis. Then, the monitor module 205 may update the virtual content. In another embodiment, the monitor module 205 may monitor a request from a user to receive augmented reality content. In one implementation, an action of a user, for example, when a user opens an augmented reality application installed in user equipment 101, is monitored by the monitor module 205 and determines that the user desires to receive augmented reality content. Further, the monitor module 205 may receive a request from a user to present an augmented reality display of the event, in one embodiment. In one exemplary scenario, the monitor module 205 may receive the request through, but is not restricted to, a text message, a video message, an email, an instant message, and the like.

In another embodiment, the monitor module 205 may receive the request when the user clicks on a button and/or an icon within the application 103. In yet another embodiment, the monitor module 205 may receive the request when the user lifts the user equipment 101 to a view of the event. Further, the monitor module 205 may further process the received request, in one embodiment. The monitor module 205 may also determine whether the request received from the user equipment 101 is present in a coverage area of the multicast data channel.

The scheduling module 207 may receive a scheduling request from a service provider, in one embodiment. The scheduling module 207 may receive a scheduling request from a service provider of the augmented reality content to schedule a delivery of the augmented reality content over the multicast data channel based on the scheduling request. In one embodiment, the scheduling module 207 may allocate virtual content to particular timeslots. The virtual content may be determined based, at least in part, on contextual criteria, and wherein contextual criteria include, at least in part, on temporal criteria. In an exemplary scenario, the service provider may schedule a delivery of the augmented reality content after, for example, one hour, ten minutes, five minutes, and the like.

Further, the scheduling module 207 may receive a scheduling request from a service provider of the augmented reality content to schedule a delivery of the augmented reality content to user equipment. In an exemplary scenario, the service provider may schedule a delivery of the augmented reality content to user equipment after a delay of, for example, five minutes, ten minutes, 30 minutes, etc. In another exemplary scenario, the service provider may request to deliver augmented reality content to user equipment after, for example, one hour of scheduled event start time.

The update module 209 may initiate storage of the augmented reality content at the user equipment 101. In one embodiment, the update module 209 may initiate storage of the augmented reality content at the user equipment 101 only when the user equipment 101 is located at the venue, during for duration of the event, or a combination thereof. In one exemplary scenario, the augmented reality content of a cricket match is stored at user equipment only when a user and the user equipment are present in a stadium where the match is being played. In another embodiment, augmented reality content is stored in user equipment 101 when a user location is different from the venue of the event. In one exemplary scenario, when people gather in a restaurant to view an event through a video that is live at another location, during for duration of the events, then the augmented reality content is updated in the user equipment 101.

Further, the update module 209 may update the augmented reality content for delivery over the multicast data channel. In one embodiment, the update module 209 may update the augmented reality content for delivery over the multicast data channel based on a progression of the event. For example, as the event progresses, the augmented reality content is updated. In another embodiment, the update module 209 may periodically update the augmented reality content for delivery over the multicast data channel. For example, the augmented reality content is updated after, for example, every 20 seconds. In yet another embodiment, the update module 209 may enable the user to manually update the augmented reality content by, for example, pressing a refresh button.

The user interface module 211 may utilize information associated with the user equipment 101 and its capabilities for presenting augmented reality content through a User Interface element at the user equipment 101. In one exemplary scenario, the user interface information may be determined from the database 117, which may include information about one or more user equipment that may be registered to the service provider. In one embodiment, the user interface module 211 may determine overlay information for virtual content based, at least in part, on location information, camera pose information, user preference information, or a combination thereof. The overlay information may include live event information, location-based service information, promotional information, or a combination thereof.

The presentation module 213 may present the augmented reality content in the augmented reality display of the event based on the user request. For example, a match score and a penalty point is presented as the augmented reality display of the event. Further, the presentation module 213 may generate notifications for the users to indicate that augmented reality content is available. In one embodiment, the presentation module 213 may present, but are not restricted to, audio alerts, visual alerts, or a combination thereof. For example, an audio alert such as a computerized speech, a beeping sound, a tone, and the like may be provided to the user to indicate that augmented reality content of the event is available. In another embodiment, the presentation module 213 may present visual alerts to the user on the user equipment. For example, the user interface module 211 display a text message on the user equipment, which may include the augmented reality content. In a further embodiment, the presentation module 213 may determine one or more guides based, at least in part, on the one or more reference objects associated with the field of view of the augmented reality user interface. The one or more guides indicate, at least in part, a direction, an orientation, or a combination thereof to move a device presenting the augmented reality display.

Figure 3:
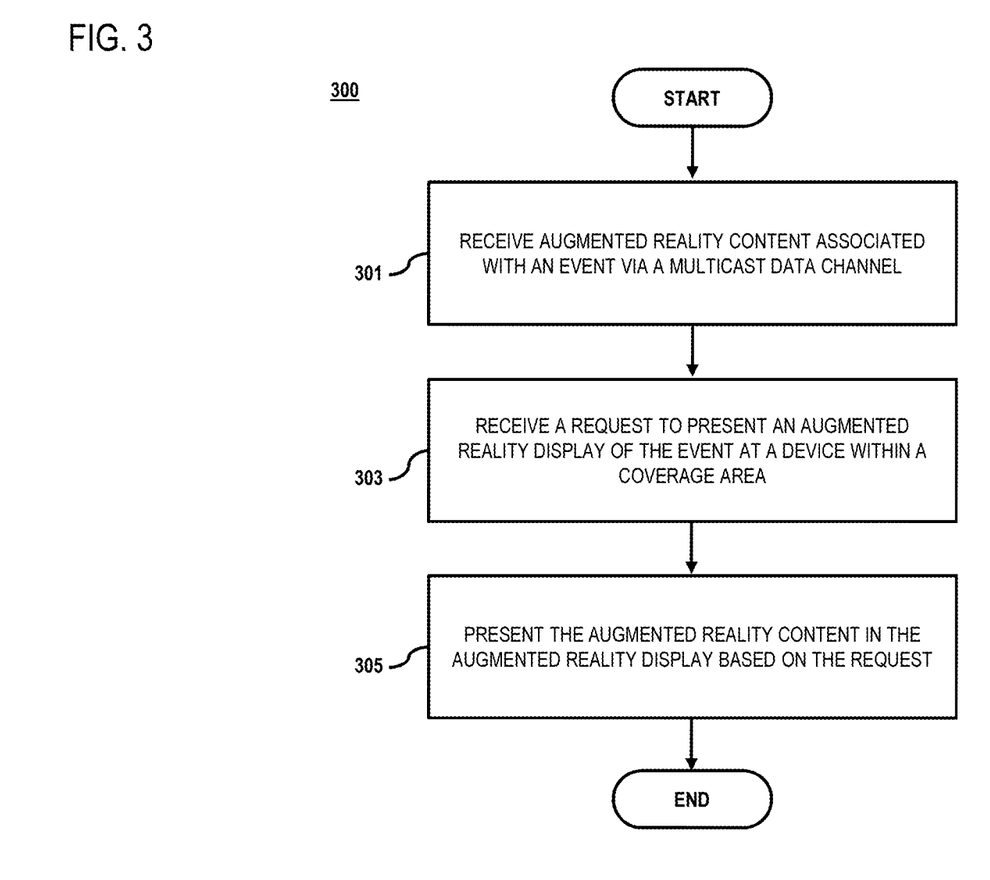
FIG. 3 is a flowchart of a process for providing the augmented reality content to the user equipment, according to one embodiment.

FIG. 3 is a flowchart of a process for providing augmented reality content to user equipment, according to an embodiment. At step 301, a rendering platform 115 receives augmented reality content associated with an event via a multicast data channel. In one implementation, the event may be a live event, for example, but is not limited to, a football match, a cricket match, a theatre, a concert, and the like. In one implementation, the augmented reality content may include, but is not restricted to, live augmented reality content associated with an event, recorded content associated with an event, a curated content, an advertising content, or a combination thereof.

In another implementation, the augmented reality content may include, but is not restricted to, information related to a service available at an event, a venue of an event, a status of a service, or a combination thereof. In one embodiment, the service may include to locate, but is not restricted to, a fully stocked concessions, a shortest cafeteria line, and the like. In another embodiment, the rendering platform 115 receives augmented reality content associated with, but is not restricted to, a venue of an event, duration of an event, a location of an event, or a combination thereof, in another implementation. In one implementation, a coverage area of the multicast data channel covers a portion of a venue associated with the event.

Next, at step 303, the rendering platform 115 receives a request to present an augmented reality display of the event at the user equipment. In one embodiment, the rendering platform 115 receives a request from a user to present an augmented reality display of the event within the coverage area of the multicast data channel. In one exemplary scenario, the rendering platform 115 receives the request from a user through, but is not restricted to, a text message, a video message, an email, an instant message, and the like. In another embodiment, the rendering platform 115 receives the request when the user clicks on a button and/or an icon within the application. In yet another embodiment, the rendering platform 115 receives the request when the user lifts the user equipment to a view of the event.

Thereafter, at step 305, the rendering platform 115 presents the augmented reality content in the augmented reality display based on the received request. In one embodiment, the rendering platform 115 generates a notification for the users to indicate that augmented reality content is available. In one embodiment, the rendering platform 115 presents, but is not restricted to, an audio alert, a visual alert, or a combination thereof. For example, an audio alert such as a computerized speech, a beeping sound, a tone, and the like may be provided to the user to indicate augmented reality content of a live event is available. In another embodiment, the rendering platform 115 presents a visual alert to the user on the user equipment. In one exemplary scenario, the rendering platform 115 displays a text message on the user equipment, which may include the augmented reality content associated with an event.

Figure 4:
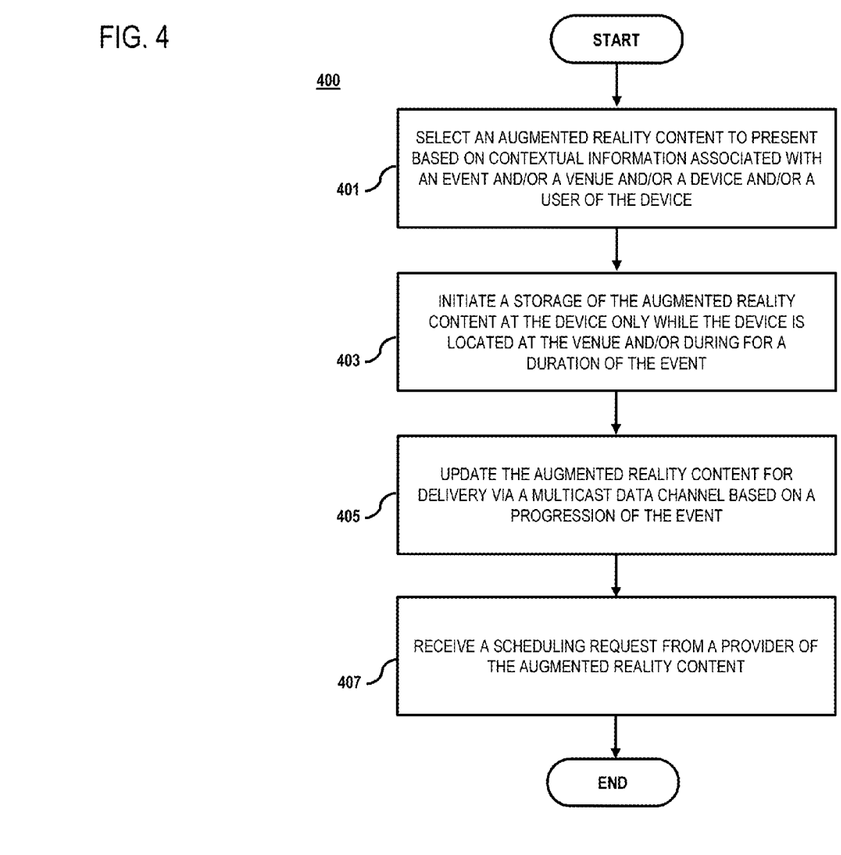
FIG. 4 is a flowchart of a process for updating the augmented reality content based on a scheduling request, according to another embodiment.

FIG. 4 is a flowchart of a process for providing augmented reality content to user equipment, according to another embodiment. At step 401, a rendering platform 115 selects augmented reality content from received augmented reality content, in one embodiment. In one implementation, the rendering platform 115 selects augmented reality content from the received augmented reality content based on contextual information. In one exemplary scenario, the rendering platform 115 only selects augmented reality content such as, a match score, from the received augmented reality content, for example, a match score, a player name, a position of a player, a position of a ball, etc. In one implementation, the rendering platform 115 selects augmented reality content based on the contextual information associated with, but is not restricted to, the event, a venue of the event, a user of user equipment, user equipment, or a combination thereof.

Further, at step 403, the rendering platform 115 initiates storage of the augmented reality content at the user equipment. In one embodiment, the rendering platform 115 initiates storage of the augmented reality content at the user equipment only when the user equipment is located at the venue, during for duration of the event, or a combination thereof. In one exemplary scenario, the augmented reality content of a cricket match is stored at user equipment only when a user and associated user equipment are present in a stadium where the match is being played. In another embodiment, augmented reality content is stored in user equipment when a user location is different from the venue of the event. In one exemplary scenario, when people gather in a restaurant to view an event through a video that is live at another location, during for duration of the event, then the augmented reality content is stored in the user equipment.

Next, at step 405, the rendering platform 115 updates the augmented reality content for delivery via a multicast data channel. In one embodiment, the rendering platform 115 updates the augmented reality content for delivery over the multicast data channel based on a progression of the event. For example, as the event progresses, the augmented reality content is updated. In another embodiment, the rendering platform 115 periodically updates the augmented reality content for delivery over the multicast data channel. For example, the augmented reality content is updated after, for example, every 30 seconds. In yet another embodiment, the rendering platform 115 enables the user to manually update the augmented reality content by, for example, pressing a refresh button within the application 103.

Thereafter, at step 407, the rendering platform 115 receives a scheduling request from a service provider of the augmented reality content to schedule a delivery of the augmented reality content to user equipment. In an exemplary scenario, the service provider may schedule a delivery of the augmented reality content to user equipment after a delay of, for example, five minutes, ten minutes, 30 minutes, etc. In another exemplary scenario, the service provider may request to deliver augmented reality content to user equipment after, for example, one hour of scheduled event start time.

Figure 5:
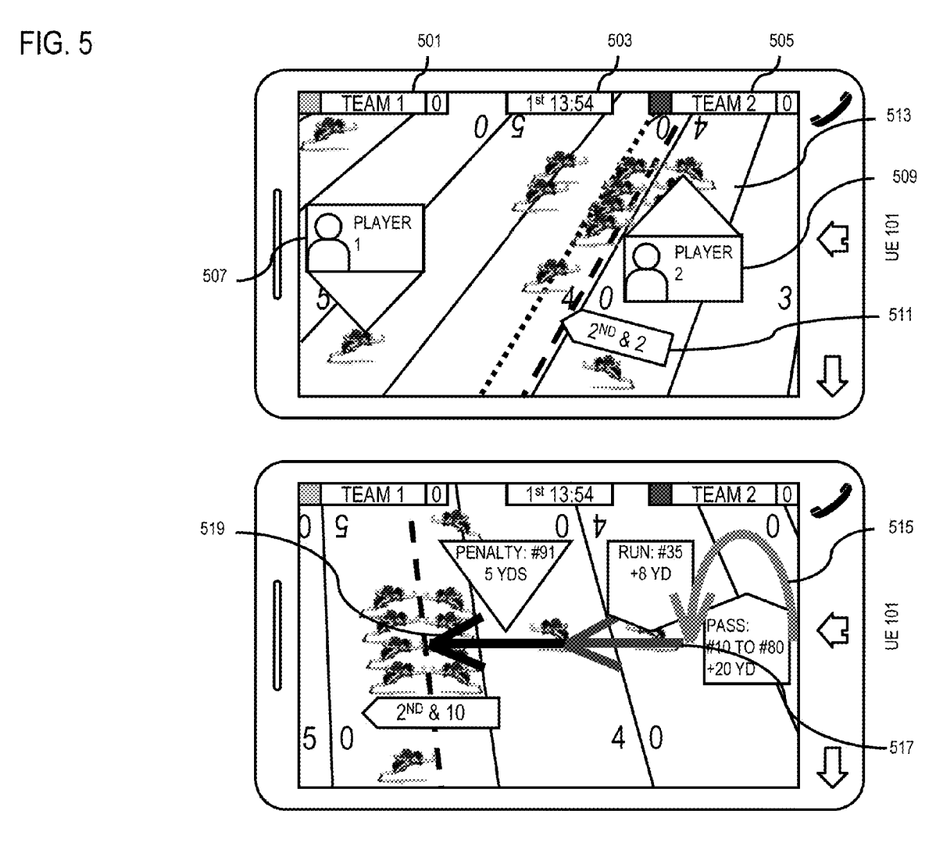
FIG. 5 is a diagram of a Graphical User Interface (GUI) of an application for displaying the augmented reality content, according to one embodiment.

FIG. 5 is a diagram of a Graphical User Interface (GUI) of an application for displaying augmented reality content on user equipment, according to one embodiment. The GUI on user equipment 101 displays a live rugby match and a score board 501 of team 1 and another score board 505 of team 2 are displayed. Further, a time of the rugby match is also displayed on a time board 503. Augmented reality content, for example, a name of player 1 and a photograph 507 and another augmented reality content, for example, a name of player 2 and a photograph 509 of player 2 are presented to a user of the user equipment based on a user request. The GUI of the user equipment further displays "$2^{nd}$ and 2" 511 positions of players in a playground 513. A database having the augmented reality content is updated and is provided to the user equipment periodically. Further, augmented reality content is displayed on the user equipment as the game progresses in the playground 513. In one exemplary scenario, augmented reality content 515 is displayed to the user that provides augmented reality content such as, a player number 10 passes a rugby ball to a player number 80 present at a distance of 20 yards. Then the augmented reality content is updated and displays that a player number 35 runs for eight yards 517 in the playground. Then a penalty point is awarded to a player number 91 while covering five yards of distance 519 to reach to a goal post of another team.

Figure 6:
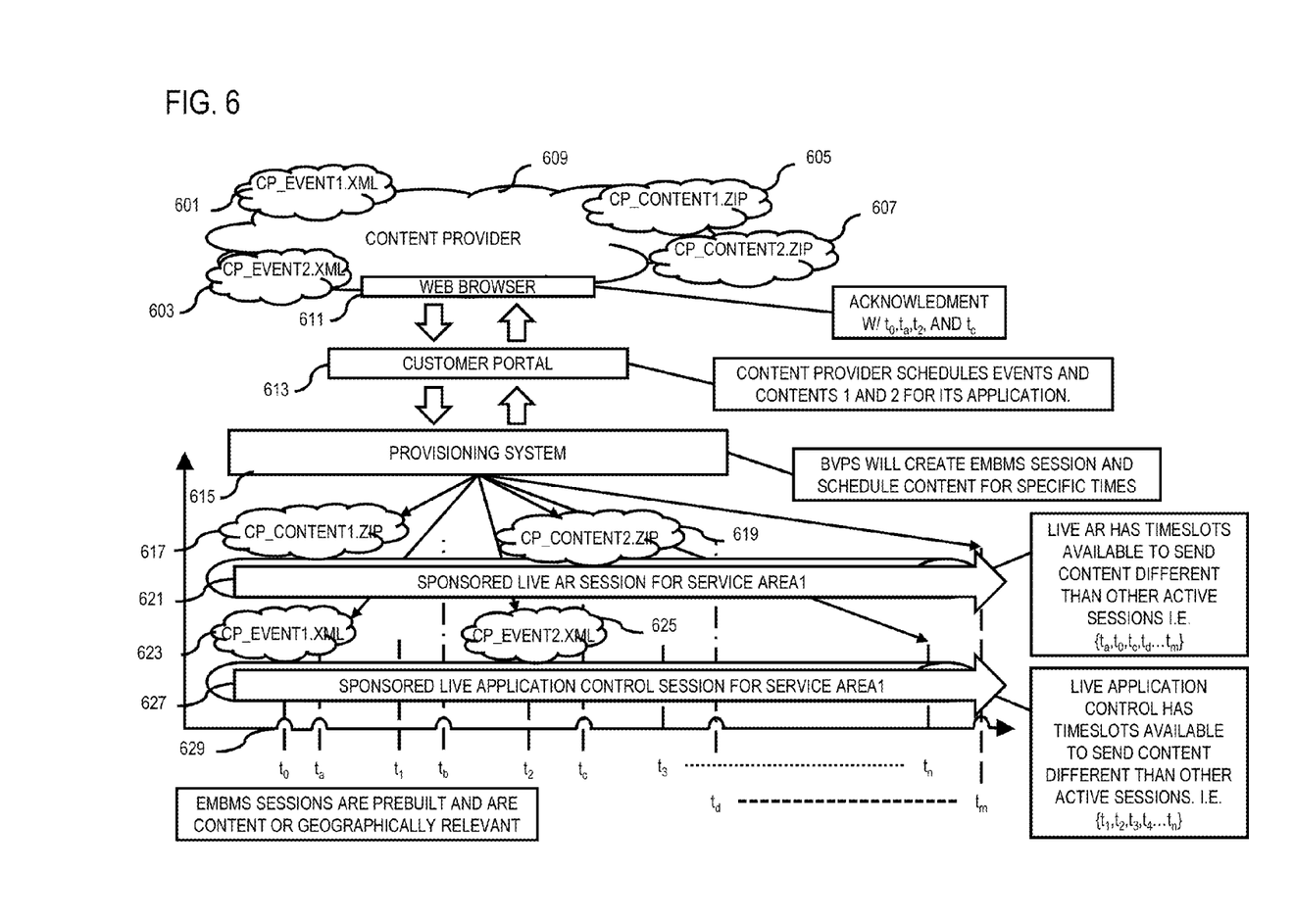
FIG. 6 illustrates interactions between a service subscriber and a service provider to provide the augmented reality content to user equipment, according to various embodiments.

FIG. 6 illustrates interactions between a service subscriber and a service provider to provide the augmented reality content to user equipment, according to various embodiments. The rendering platform 115 may interact with elements of the system 100 to provide augmented reality content to the user equipment. Augmented reality content associated with various events is received via a multicast data channel. The augmented reality content may be received for different portions and/or view of a venue of the event via multiple multicast data channels. In an exemplary scenario, augmented reality content associated with two events, for example, event 1 and event 2, are received as Extensible Markup Language (XML) files "CP_EVENT 1.XML" 601 and "CP_EVENT 2.XML" 603 by a content provider 609. Further, the augmented reality content may also be received as zip files, such as "CP_CONTENT 1.ZIP" 605 and "CP_CONTENT 2.ZIP" 607 by the content provider 609. In one scenario, the content provider 609 may have the latest XML data that is packaged together with concession data (e.g., ZIP files that have information on the wait time for concession stands, wait time for restrooms, location for concession stands, locations for restrooms etc.). The content provider 609 then provides the received augmented reality content to a web browser 611 that provides an acknowledgement of the received augmented reality content. In one scenario, content may be provided at some periodicity, for example, every few seconds a new file may be sent that is essentially an updated version, for example, a user may be notified that the wait time for restroom is 3 minutes. Shortly, the user may be notified that the wait time for restroom is 1 minute, and so on. In another scenario, the "CP_CONTENT 2.ZIP" 607 may be content sent as packaged information specific to a service area. For example, users attending a football match may receive content that is relevant to the match being played, but the users may also receive an up-to-date information on the venue the user is at. In addition, one more advertisement (e.g., coupons) may be layered on the screen. These information may be zipped together as packaged information that can be provided on the screen of a user equipment 101. In a further scenario, a venue may not be able to provide complete information in a service area. It is possible to receive information from third party content providers. For example, users may receive updated data (e.g., content2.zip) regarding player statistics from the player statistics feed. The web browser 611 transmits the augmented reality content to a customer portal 613, where the content provider 609 may schedule events and the augmented reality content for the event 1 and the event 2 for its applications. In one scenario, the customer (i.e., users) can design their requirements in the customer portal 613, for example, the customer wants to receive player statistics every second, or receive venue services every five seconds. In such manner, a service is built to take up a session reservation. In addition, the content provider 609 may receive feedback from customer portal 613 on the delivery of the content, for example, time-based information on the delivery of an advertisement, time-based information on the delivery of a package, information on where the package was delivered etc.). In one scenario, ahead of a customer request onto the network, the system may determine the AR information a user is going to download based, at least in part, on where a mobile device is pointed at the field. The system may determine from the vantage point of a user that the user is going to request information on the team that is playing, and general information about the stadium. There is no reason for a user to download information on every football player, because that is unnecessary. In such manner, the system is trying to make it more efficient on the network and for the user, and create a better customer experience. In one exemplary embodiment, the scheduling may include, but is not restricted to, a specific time (e.g., $t_0$, $t_2$, etc.) for the delivery of the augmented reality content to the user equipment. The customer portal 613 may then communicate the augmented reality content to a provisioning system 615. In one exemplary embodiment, the provisioning system 615 may be, but is not restricted to, a Broadcast Video Provisioning System (BVPS).

The provisioning system 615 creates Evolved Multimedia Broadcast Multicast Service (eMBMS) sessions and also schedules the augmented reality content for specific times. In various embodiments, the provisioning system 615 may schedule delivery of the augmented reality content based on specific times requested by their respective sponsors (e.g., service subscribers), a prioritized schedule based on a type of event and/or content, a first-come-first-served mechanism, network traffic, and the like. In one scenario, the system may schedule an experience based, at least in part, on the content that has already been delivered to a device. In one exemplary scenario, the provisioning system 615 provides "CP_CONTENT 1.ZIP" 617 and "CP_CONTENT 2.ZIP" 619 as a sponsored live augmented reality session for a service area 1 621. In one scenario, by having it live, the system can toggle advertisement in the field through the view finder while the user is watching the statistics, or the match. The live augmented reality has timeslots available to send augmented reality content different than other active sessions, i.e., $t_a$, $t_0$, $t_c$, $t_d$, etc. Further, the provisioning system 615 provides "CP_EVENT 1.XML" 623 and "CP_EVENT 2.XML" 625 as a sponsored live application control session for the service area 1 627. The live application control has timeslots available to send the augmented reality content different than the other active sessions, i.e., $t_1$, $t_2$, $t_3$, $t_4$, etc. In one embodiment, the provisioning system 615 may schedule the augmented reality content for delivery through eMBMS sessions 629 that may be, but is not restricted to, prebuilt, and may also be content and/or geographically relevant. In one scenario, when a user holds his camera to a concession stand, the user may be displayed several tabs. The user may want to scroll between the inventories of each tab. For this reason, the service provider may package all the information (i.e., relevant to time and place, ensuring users engagement) together, and show them all at once. In another scenario, an event line tactic may be implemented, a signaling method that selects specific time to trigger an experience. It can be done on periodicity, or it can be done on a schedule (e.g., an hour before the game all the attendees should be triggered with concession coupons every five seconds, or every time any object recognizes a concession stands they would see the concession coupons for the next hour). But, during the game, the triggering is not more about pricing but more about getting the last couple of drinks or not stand in a line.

Figure 7:
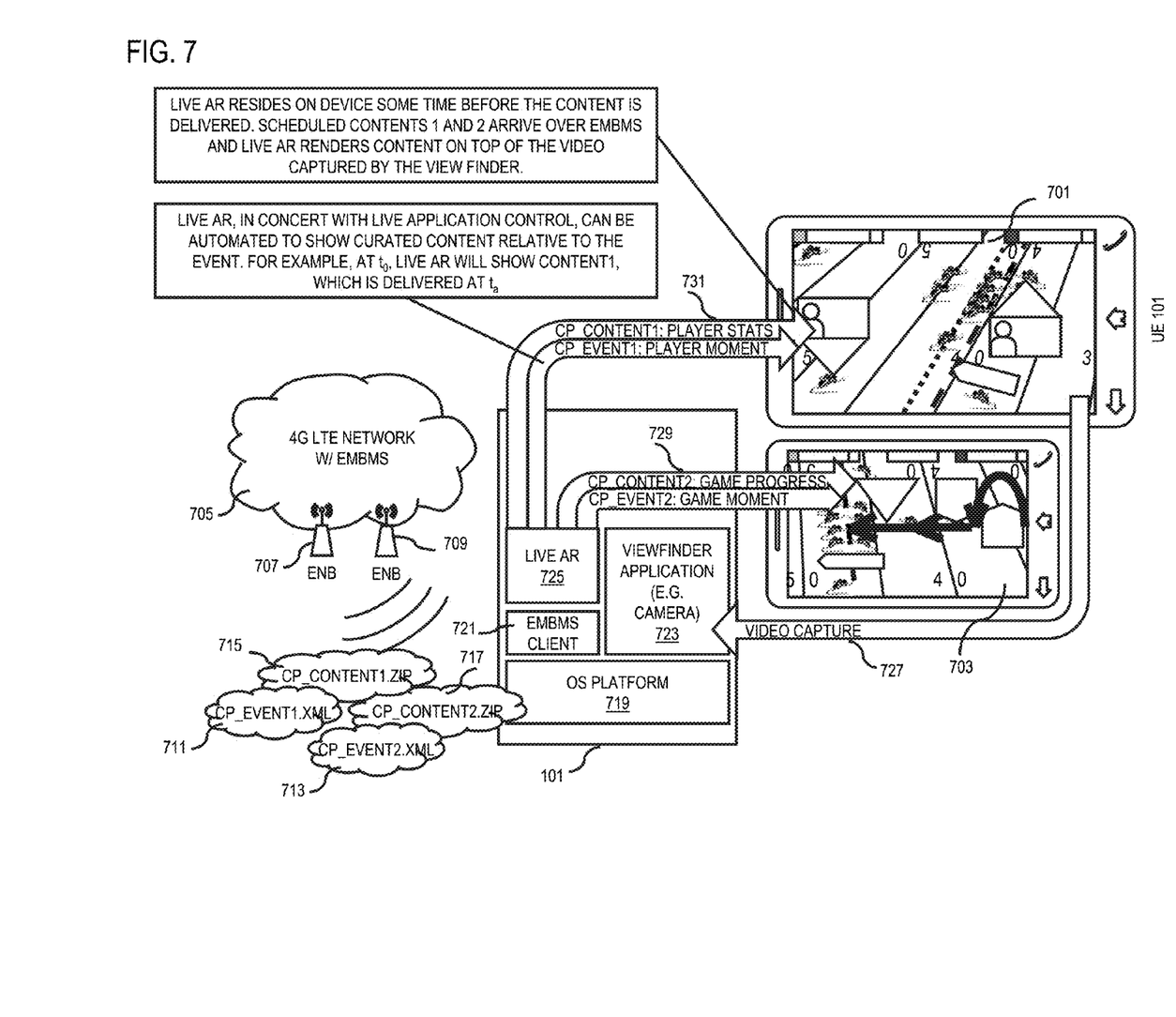
FIG. 7 illustrates an interaction process to provide the augmented reality content to user equipment, according to one embodiment.

FIG. 7 illustrates an interaction process to provide augmented reality content to user equipment, according to one embodiment. In one exemplary scenario, the rendering platform 115 may cause a communication network provider 705 to communicate augmented reality content to the user equipment 101 via evolved node B 707 and 709. In one implementation, the communication network provider 705 may be, but is not restricted to, a 4G LTE network. The augmented reality content may be provided to the user equipment in different file formats, for example, "CP_EVENT 1.XML" 711 and "CP_EVENT 2.XML" 713. Further, the network provider 705 may transmit "CP_CONTENT 1.ZIP" 715 and "CP_CONTENT 2.ZIP" 717 as a sponsored live augmented reality session to the user equipment. An Operating System (OS) platform 719 in the user equipment manages hardware and software resources of the user equipment. An eMBMS client 721 may process the received augmented reality content to display the augmented reality content based on a request received from a user of the user equipment 101. In one implementation, the eMBMS client 721 may be an application installed in the user equipment.

In one exemplary scenario, when the user opens a viewfinder application 723, for example, a camera, that communicates with a live Augmented Reality (AR) 725 in the user equipment 101 to request for a live augmented reality content associated with a view captured (e.g., a video) by the viewfinder application 723. In one implementation, the live AR 725 may be an application installed in the user equipment. In one exemplary scenario, the live AR 725 resides on the user equipment before the augmented reality content is delivered. The augmented reality content 1 and 2 arrive over an eMBMS session and the live AR 725 renders the augmented reality content on top of a video 727 captured by the viewfinder 723. The live AR 725 provides the augmented reality content to the user equipment 101 based on the captured video. The live AR 725 then provides (at 729) a "CP_CONTENT 2" that may include a game progress of the event 2 "CP_EVENT 2", i.e., a game moment. Also, the "CP_CONTENT 2" is displayed on a GUI 703 of the user equipment 101 that displays the progress of the game within a field. In another exemplary scenario, the live AR 725 may provide (at 731) a "CP_CONTENT_1" that may include a player's statistics and "CP_EVENT 1" i.e., a player moment. The player statistics and the player moment are displayed on a GUI 701 of the user equipment 101. In one exemplary scenario, the live AR 725 in concert with a Live Application Control may be automated to show a curated content relative to the event. For example, at scheduled time $t_0$, live AR may display augmented reality content 1 that is delivered to the user equipment at time $t_a$.

The processes described herein for providing augmented reality content to a user equipment via a multicast data channel may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below.

Figure 8:
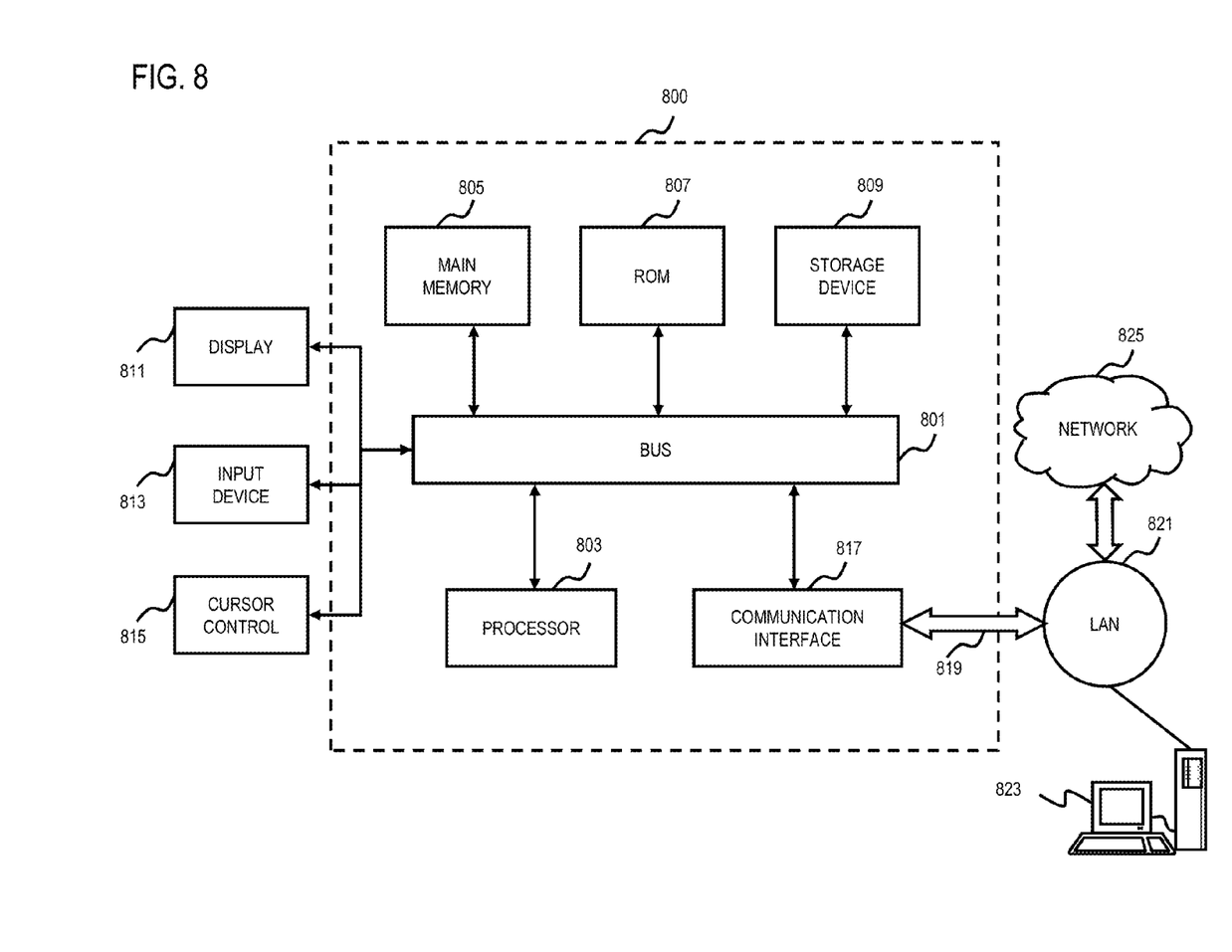
FIG. 8 is a diagram of a computer system that can be used to implement various exemplary embodiments.

FIG. 8 illustrates a computing hardware (e.g., mobile system) 800 on which exemplary embodiments may be implemented. The mobile system 800 includes a bus 801 or other communication mechanism for communicating information and a processor 803 coupled to the bus 801 for processing the information. The mobile system 800 also includes a main memory 805, such as a Random Access Memory (RAM) or other dynamic storage device, coupled to the bus 801 for storing the information and instructions to be executed by the processor 803. The main memory 805 may also be used for storing temporary variables or other intermediate information during execution of instructions by the processor 803. The mobile system 800 may further include a Read Only Memory (ROM) 807 or other static storage device coupled to the bus 801 for storing static information and instructions for the processor 803. A storage device 809, such as a magnetic disk or an optical disk, is coupled to the bus 801 for persistently storing information and instructions.

The mobile system 800 may be coupled via the bus 801 to a display 811, such as a Cathode Ray Tube (CRT), a liquid crystal display, an active matrix display, or a plasma display, for displaying information to the mobile user. An input device 813, such as a keyboard including alphanumeric and other keys, is coupled to the bus 801 for communicating information and command selections to the processor 803. Another type of a user input device may be a cursor control 815, such as a mouse, a trackball, or cursor direction keys, for communicating direction information and command selections to the processor 803 and for controlling cursor movement on the display 811.

According to an exemplary embodiment, the processes described herein are performed by the mobile system 800, in response to the processor 803 executing an arrangement of instructions contained in the main memory 805. Such instructions may be read into the main memory 805 from another computer-readable medium, such as the storage device 809. Execution of the arrangement of instructions contained in the main memory 805 causes the processor 803 to perform the process steps described herein. One or more processors in a multi-processing arrangement may also be employed to execute the instructions contained in the main memory 805. In alternative embodiments, hard-wired circuitry may be used in place of or in combination with software instructions to implement exemplary embodiments. Thus, exemplary embodiments are not limited to any specific combination of hardware circuitry and software.

The mobile system 800 may also include a communication interface 817 coupled to the bus 801. The communication interface 817 provides a two-way data communication coupling to a network link 819 connected to a Local Area Network (LAN) 821. For example, the communication interface 817 may be a Digital Subscriber Line (DSL) card or modem, an Integrated Services Digital Network (ISDN) card, a cable modem, a telephone modem, or any other communication interface to provide a data communication connection to a corresponding type of communication line. As another example, the communication interface 817 may be a Local Area Network (LAN) card (e.g., for Ethernet™ or an Asynchronous Transfer Mode (ATM) network) to provide a data communication connection to a compatible LAN. Wireless links may also be implemented, in one embodiment. In any such implementation, the communication interface 817 sends and receives electrical, electromagnetic, or optical signals that carry digital data streams representing various types of information. Further, the communication interface 817 may include peripheral interface devices, such as a Universal Serial Bus (USB) interface, a Personal Computer Memory Card International Association (PCMCIA) interface, etc. Although a single communication interface 817 is depicted in FIG. 8, multiple communication interfaces may also be employed.

The network link 819 typically provides data communication through networks to other data devices. For example, the network link 819 may provide a connection through the LAN 821 to a host computer 823, which has connectivity to a network 825 (e.g., a Wide Area Network (WAN) or the global packet data communication network now commonly referred to as the "Internet") or to data equipment operated by a service provider. The LAN 821 and the network 825 both use electrical, electromagnetic, or optical signals to convey information and instructions. The signals through the various networks and the signals on the network link 819 and through the communication interface 817, which communicate digital data with the mobile system 800, are exemplary forms of carrier waves bearing the information and instructions.

The mobile system 800 may send messages and receive data, including program code, through the network(s), the network link 819, and the communication interface 817. In the Internet example, a server (not shown) might transmit requested code belonging to an application program for implementing an exemplary embodiment through the network 825, the LAN 821 and the communication interface 817. The processor 803 may execute the transmitted code while being received and/or store the code in the storage device 809, or other non-volatile storage for later execution. In this manner, the mobile system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media may include, for example, optical or magnetic disks, such as the storage device 809. Volatile media may include a dynamic memory, such as the main memory 805. Transmission media may include coaxial cables, copper wire and fiber optics, including the wires that include the bus 801. Transmission media may also take the form of acoustic, optical, or electromagnetic waves, such as those generated during Radio Frequency (RF) and infrared (IR) data communications. Common forms of computer-readable media may include, for example, a floppy disk, a flexible disk, hard disk, magnetic tape, any other magnetic medium, a CD-ROM, a Compact Disc-Rewritable (CDRW), a Digital Video Disk (DVD), any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read. In certain cases, the computer readable media may include an unknown physical component wherein the information is uniquely defined by a special digital unique identifier and is available through multiple physical channels either simultaneously or exclusively.

Various forms of computer-readable media may be involved in providing instructions to a processor for execution. For example, the instructions for carrying out at least part of the exemplary embodiments may initially be borne on a magnetic disk of a remote mobile device. In such a scenario, the remote mobile device loads the instructions into the main memory and sends the instructions over a telephone line using a modem. A modem of a local computer system receives the data on the telephone line and uses an infrared transmitter to convert the data to an infrared signal and transmit the infrared signal to a portable computing device, such as a Personal Digital Assistant (PDA) or a laptop. An infrared detector on the portable computing device receives the information and instructions borne by the infrared signal and places the data on a bus. The bus conveys the data to a main memory, from which a processor retrieves and executes the instructions. The instructions received by the main memory can optionally be stored on storage device either before or after execution by processor.

Figure 9:
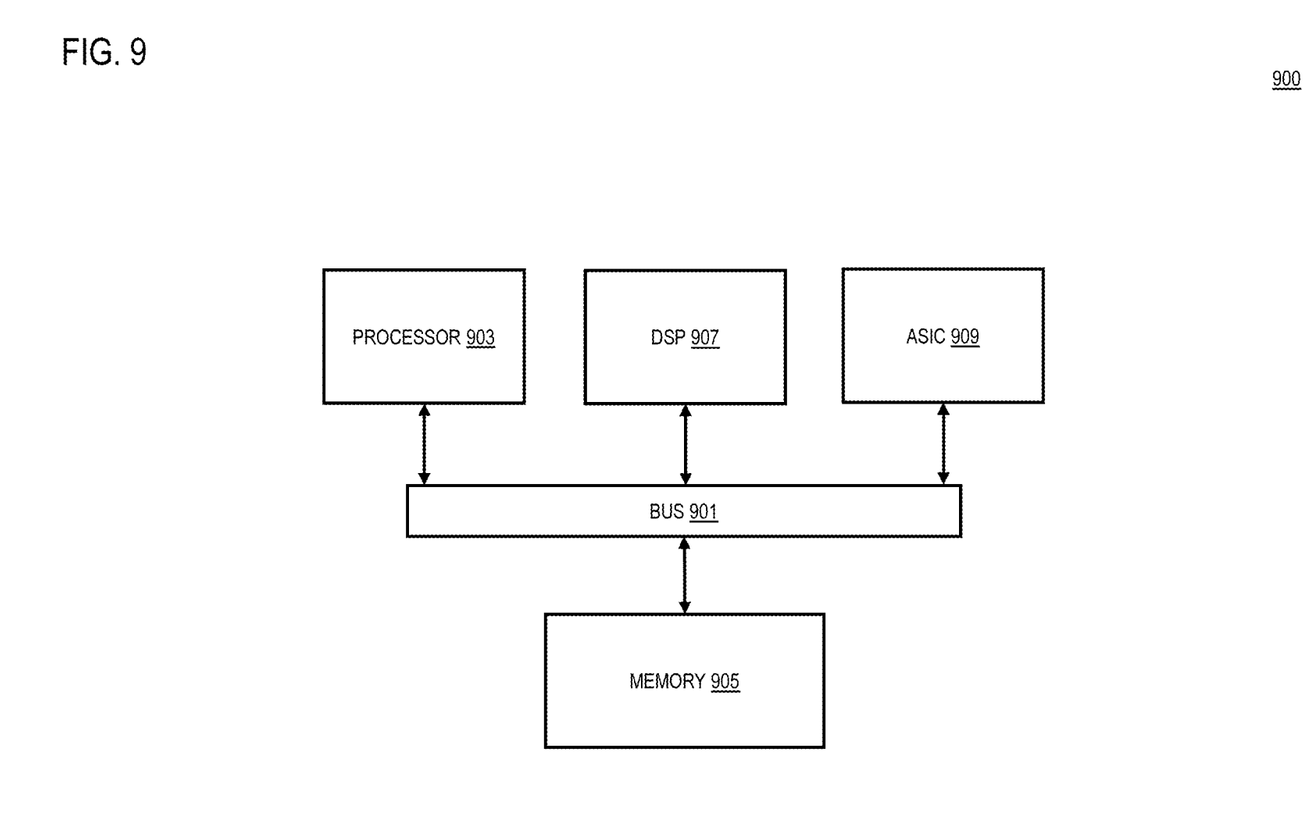
FIG. 9 is a diagram of a chip set upon which an embodiment of the invention may be implemented, according to one embodiment.

FIG. 9 illustrates a chip set 900 upon which an embodiment of the invention may be implemented. The chip set 900 is programmed to present a slideshow as described herein and includes, for instance, the processor and memory components described with respect to FIG. 8 incorporated in physical packages (e.g., chips). By way of example, a physical package may include an arrangement of materials, components, and/or wires on a structural assembly (e.g., a baseboard) to provide characteristics such as physical strength, conservation of size, and/or limitation of electrical interaction. It is contemplated that in certain embodiments the chip set 900 can be implemented in a single chip.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include processing cores with each core to perform independently. A multi-core processor enables multiprocessing within a single physical package. Examples of a multi-core processor may include two, four, eight, or greater numbers of processing cores. Alternatively or in addition, the processor 903 may include microprocessors configured in tandem via the bus 901 to enable independent execution of instructions, pipelining, and multithreading. The processor 903 may also be accompanied with specialized components to perform certain processing functions and tasks such as Digital Signal Processors (DSP) 907, or Application-Specific Integrated Circuits (ASIC) 909. The DSP 907 typically processes real-world signals (e.g., sound) in real-time independently of the processor 903. Similarly, the ASIC 909 may perform specialized functions not easily performed by a general purposed processor. Other specialized components to aid in performing the inventive functions described herein include Field Programmable Gate Arrays (FPGA) (not shown), controllers (not shown), or other special-purpose computer chips.

The processor 903 and accompanying components have connectivity to the memory 905 via the bus 901. The memory 905 may include both a dynamic memory (e.g., RAM, magnetic disk, writable optical disk, etc.) and a static memory (e.g., ROM, CD-ROM, etc.) for storing executable instructions that when executed perform the inventive steps described herein to controlling a mobile device. The memory 905 also stores the data associated with or generated by the execution of the inventive steps.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
receiving, on a scheduled basis and by a user device, augmented reality content associated with an event via a multicast data channel,
wherein a coverage area of the multicast data channel covers at least a portion of a venue associated with the event,
wherein each item of the scheduled augmented reality content is associated with a particular time,
wherein the user device is located within the coverage area,
wherein the augmented reality content is delivered over the multicast data channel based on a scheduling request from a provider of the augmented reality content;
determining, by the user device, that a particular augmented reality content item, of the received augmented reality content, is available for viewing at the user device, the determining including:
determining that a present time matches the particular time associated with the particular augmented reality content item;
presenting, by the user device, based on determining that the present time matches the particular time associated with the particular augmented reality content item, an alert indicating that the particular augmented reality content item is available for viewing;
receiving, by the user device and after presenting the alert, a request to present the particular augmented reality content item;
presenting the particular augmented reality content item via a display device of the user device based on the request; and
providing, by the user device and to the provider of the augmented reality content, feedback regarding the delivery of the augmented reality content.

2. The method of claim 1, wherein determining that the particular augmented reality content item is available for viewing is further based on:
contextual information associated with the event, the venue, the device, a user of the device, or a combination thereof.

3. The method of claim 1, wherein the multicast data channel is provisioned based on the venue, a location of the event, a duration of the event, or a combination thereof.

4. The method of claim 1, further comprising:
initiating a storage of the augmented reality content at the user device only while the user device is located at the venue, during a duration of the event, or a combination thereof.

5. The method of claim 1, further comprising:
updating the presented augmented reality content based on a progression of the event, the updating being performed based on the scheduled basis on which the augmented reality content is received via the multicast data channel.

6. The method of claim 1, wherein the augmented reality content includes live content associated with the event, recorded content associated with the event, curated content, advertising content, or a combination thereof.

7. The method of claim 1, further comprising:
presenting guide information that indicates a direction or an orientation in which the user device should be faced in order to view the particular augmented reality content.

8. A user device, comprising:
a non-transitory computer-readable medium storing a set of processor-executable instructions; and
a processor configured to execute the set of processor-executable instructions, wherein executing the set of processor-executable instructions causes the processor to:
receive, on a scheduled basis, augmented reality content associated with an event via a multicast data channel,
wherein a coverage area of the multicast data channel covers at least a portion of a venue associated with the event,
wherein each item of the scheduled augmented reality content is associated with a particular time that is defined as an offset of a start time of the event,
wherein the user device receives the augmented reality content when the user device is located within the coverage area,
wherein the augmented reality content is delivered over the multicast data channel based on a scheduling request from a provider of the augmented reality content;
determine that a particular augmented reality content item, of the received augmented reality content, is available for viewing at the user device, the determining including:
determining that a present time matches the particular time associated with the particular augmented reality content item;
present, at the present time and based on determining that the present time matches the particular time associated with the particular augmented reality content item, an alert indicating that the particular augmented reality content item is available for viewing;
receive, after presenting the alert, a request to present the particular augmented reality content item;
present the particular augmented reality content item via a display device of the user device based on the request; and
provide, to the provider of the augmented reality content, feedback regarding the delivery of the augmented reality content.

9. The user device according to claim 8, wherein determining that the particular augmented reality content item is available for viewing is further based on:
contextual information associated with the event, the venue, the device, a user of the device, or a combination thereof.

10. The user device according to claim 8, wherein the multicast data channel is provisioned based on the venue, a location of the event, a duration of the event, or a combination thereof.

11. The user device according to claim 8, wherein executing the set of processor-executable instructions further causes the processor to:
initiate a storage of the augmented reality content at the device only while the device is located at the venue, during a duration of the event, or a combination thereof.

12. The user device according to claim 8, wherein executing the set of processor-executable instructions further causes the processor to:
update the presented augmented reality content based on a progression of the event, the updating being performed based on the scheduled basis on which the augmented reality content is received via the multicast data channel.

13. The user device according to claim 8, wherein the augmented reality content includes live content associated with the event, recorded content associated with the event, curated content, advertising content, or a combination thereof.

14. The user device according to claim 8, wherein the augmented reality content includes information related to:
a service available at the event, the venue, or a combination thereof;
a status of the service; or
a combination thereof.

15. The user device of claim 8, wherein executing the processor-executable instructions further causes the processor to:
present guide information that indicates a direction or an orientation in which the user device should be faced in order to view the particular augmented reality content.

16. A non-transitory computer-readable medium, storing processor-executable instructions, which, when executed by a processor of a user device, cause the processor to:
receive, on a scheduled basis, augmented reality content associated with an event via a multicast data channel,
wherein a coverage area of the multicast data channel covers at least a portion of a venue associated with the event,
wherein each item of the scheduled augmented reality content is associated with a particular time that is defined as an offset of a start time of the event,
wherein the user device receives the augmented reality content when the user device is located within the coverage area,
wherein the augmented reality content is delivered over the multicast data channel based on a scheduling request from a provider of the augmented reality content;
determine that a particular augmented reality content item, of the received augmented reality content, is available for viewing at the user device, the determining including:
determining that a present time matches the particular time associated with the particular augmented reality content;
present, at the present time and based on determining that the present time matches the particular time associated with the particular augmented reality content item, an alert indicating that the particular augmented reality content item is available for viewing;
receive, and after presenting the alert, a request to present the particular augmented reality content item;
present the particular augmented reality content item via a display device of the user device based on the request; and
provide, to the provider of the augmented reality content, feedback regarding the delivery of the augmented reality content.

17. The non-transitory computer-readable medium of claim 16, wherein determining that the particular augmented reality content item is available for viewing is further based on:

contextual information associated with the event, the venue, the device, a user of the device, or a combination thereof.

18. The non-transitory computer-readable medium of claim 16, wherein the multicast data channel is provisioned based on the venue, a location of the event, a duration of the event, or a combination thereof.

19. The non-transitory computer-readable medium of claim 16, wherein executing the processor-executable instructions further causes the processor to:
   initiate a storage of the augmented reality content at the device only while the device is located at the venue, during a duration of the event, or a combination thereof.

20. The non-transitory computer-readable medium of claim 16, wherein executing the processor-executable instructions further causes the processor to:
   present guide information that indicates a direction or an orientation in which the user device should be faced in order to view the particular augmented reality content.

* * * * *